United States Patent [19]

Bodenheimer

[11] Patent Number: 4,732,360
[45] Date of Patent: Mar. 22, 1988

[54] COMBINATION UNDERSLUNG AND FRONT WALL MOUNTED ELECTRIC GENERATOR UNIT HOUSING FOR USE WITH REFRIGERATED FREIGHT CONTAINERS

[75] Inventor: Bert A. Bodenheimer, Stamford, Conn.

[73] Assignee: B. A. Bodenheimer & Co., Inc., Stamford, Conn.

[21] Appl. No.: 11,297

[22] Filed: Feb. 4, 1987

[51] Int. Cl.⁴ ............................................. F16M 3/00
[52] U.S. Cl. .................................... 248/645; 220/1.5; 248/637
[58] Field of Search ............... 208/647, 637, 672, 676, 208/678; 108/51.1; 220/1.5; 410/2, 77

[56] References Cited

U.S. PATENT DOCUMENTS

| | | | |
|---|---|---|---|
| 4,022,413 | 5/1977 | Isaacs | 248/678 X |
| 4,344,368 | 8/1982 | Remington et al. | 108/51.1 |
| 4,493,428 | 1/1985 | Mittelmann et al. | 220/1.5 |
| 4,630,746 | 12/1986 | Fortenberry | 220/1.5 X |

OTHER PUBLICATIONS

Containerisation International Yearbook 1979 (p. 380).
Carrier Transicold Co. Bulletin (date unknown).

*Primary Examiner*—Ramon O. Ramirez
*Attorney, Agent, or Firm*—David P. Gordon

[57] ABSTRACT

A housing for a generator unit which is for mounting on a freight container unit is provided where the identical housing may be mounted on the container on a clip-on fashion or on a chassis supporting the container in an underslung fashion. The provided housing generally comprises: a substantially rigid frame having a horizontal member of a length equal to the width of the front face of the container, and at least two vertical posts integrally connected to the horizontal member; two fitting means extending outward from the vertical posts to engage the corner castings of the container so as to permit the housing to be hung from the container; at least two horizontal force clamps connected to the vertical posts for engaging the corner posts of the container so as to substantially remove horizontal forces from the housing when it is hung from the container, at least a portion of the clamps being capable of being extended in a manner perpendicular to the horizontal member beyond the corner posts and of being rotated so as to permit engagement by the clamps with the back side of the corner posts; and at least two foldable attachment arms which are supported by the rigid frame, the arms being folded inside the housing when the generator unit is in its clip-on mode, and the arms being capable of being extended so as to perpendicularly engage the bottom parallel beam supports of the chassis and clamp thereto in the underslung mode.

21 Claims, 7 Drawing Figures

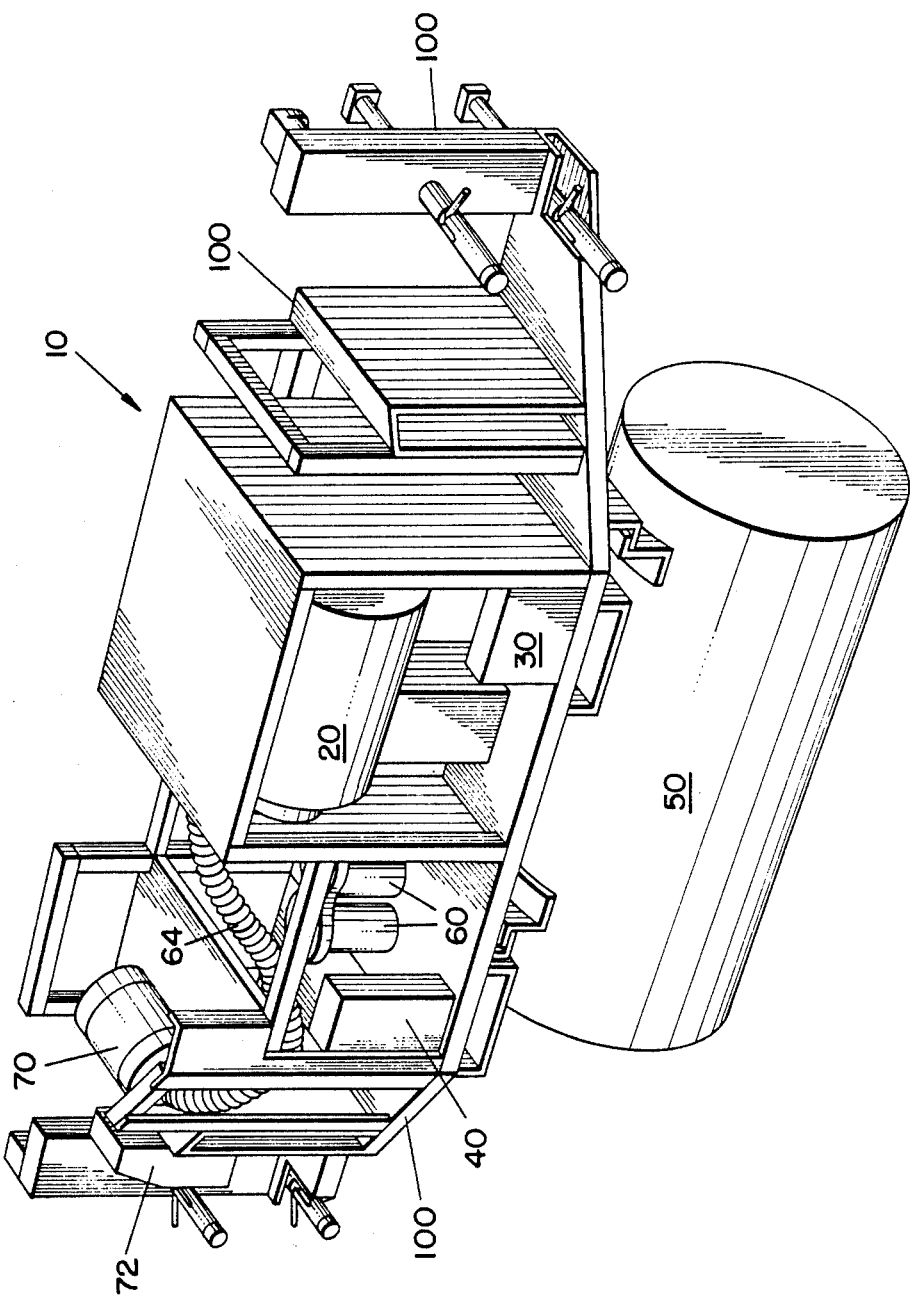

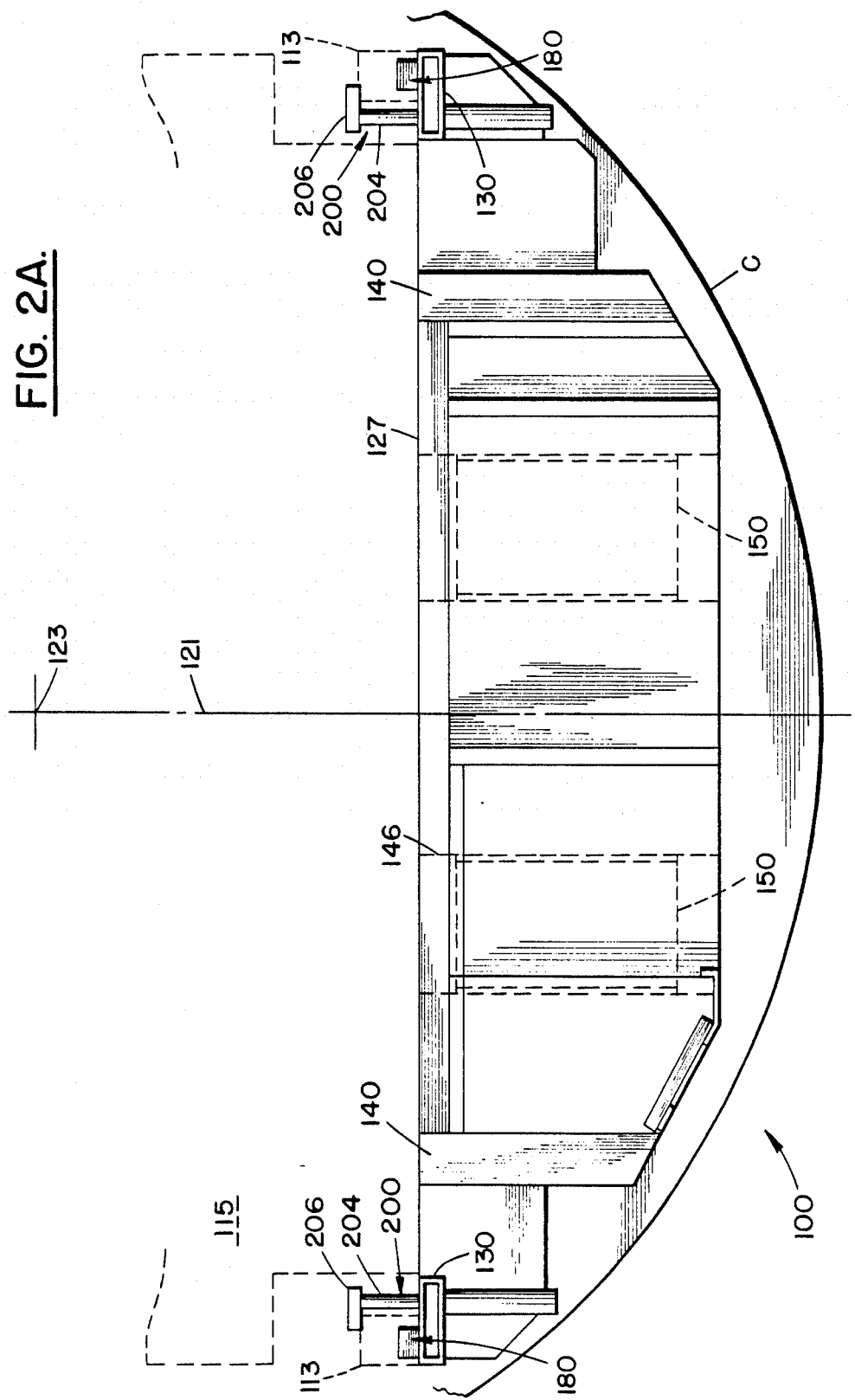

FIG. 3.
FIG. 4.
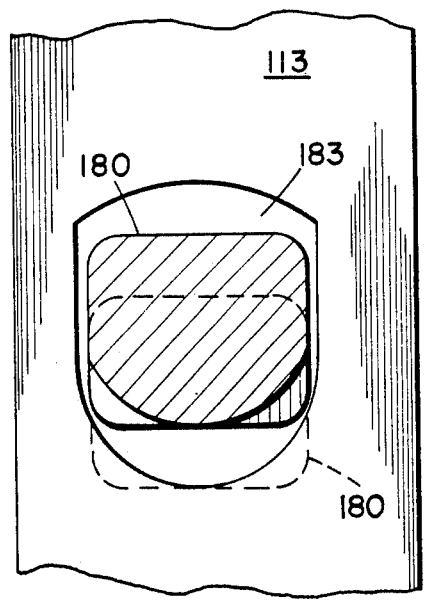
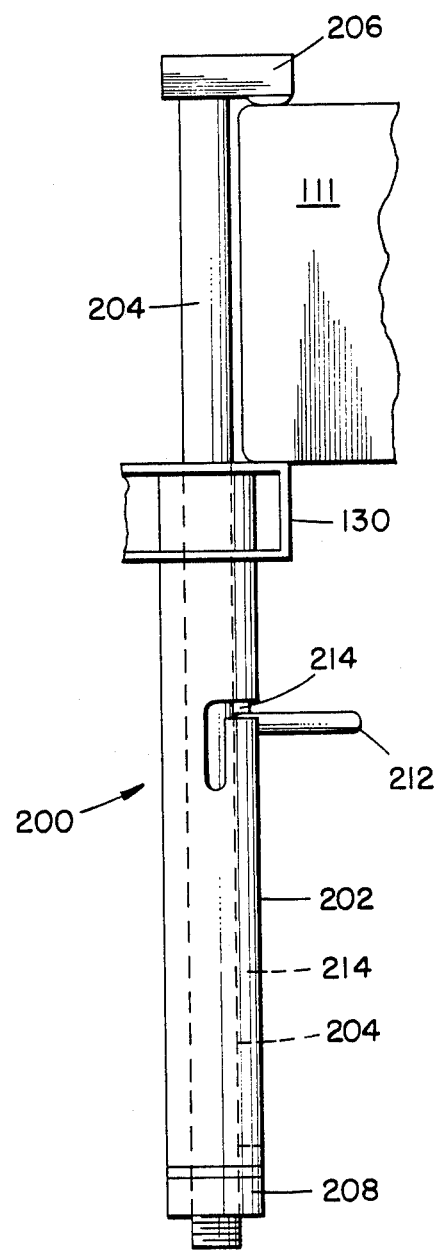

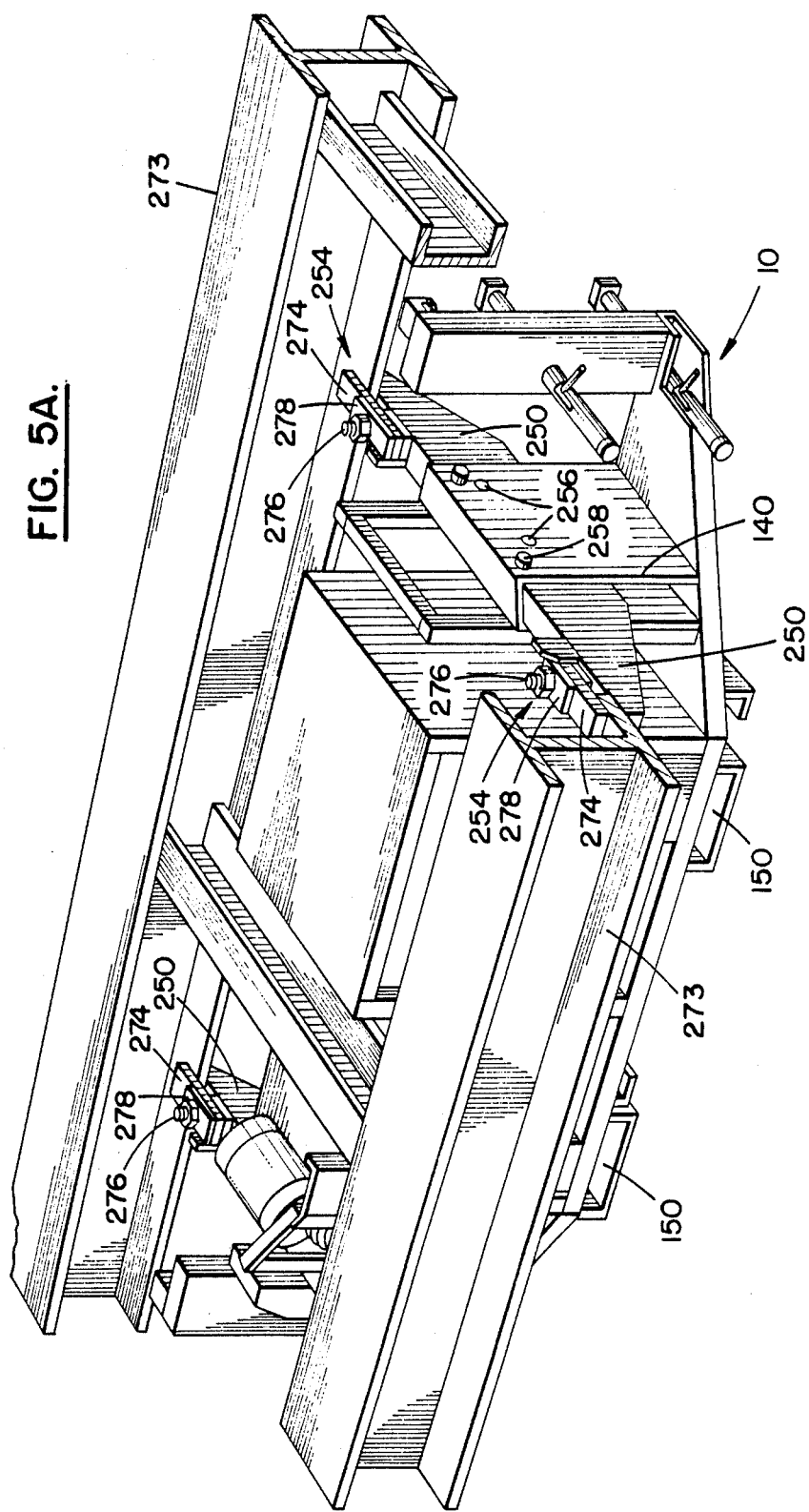

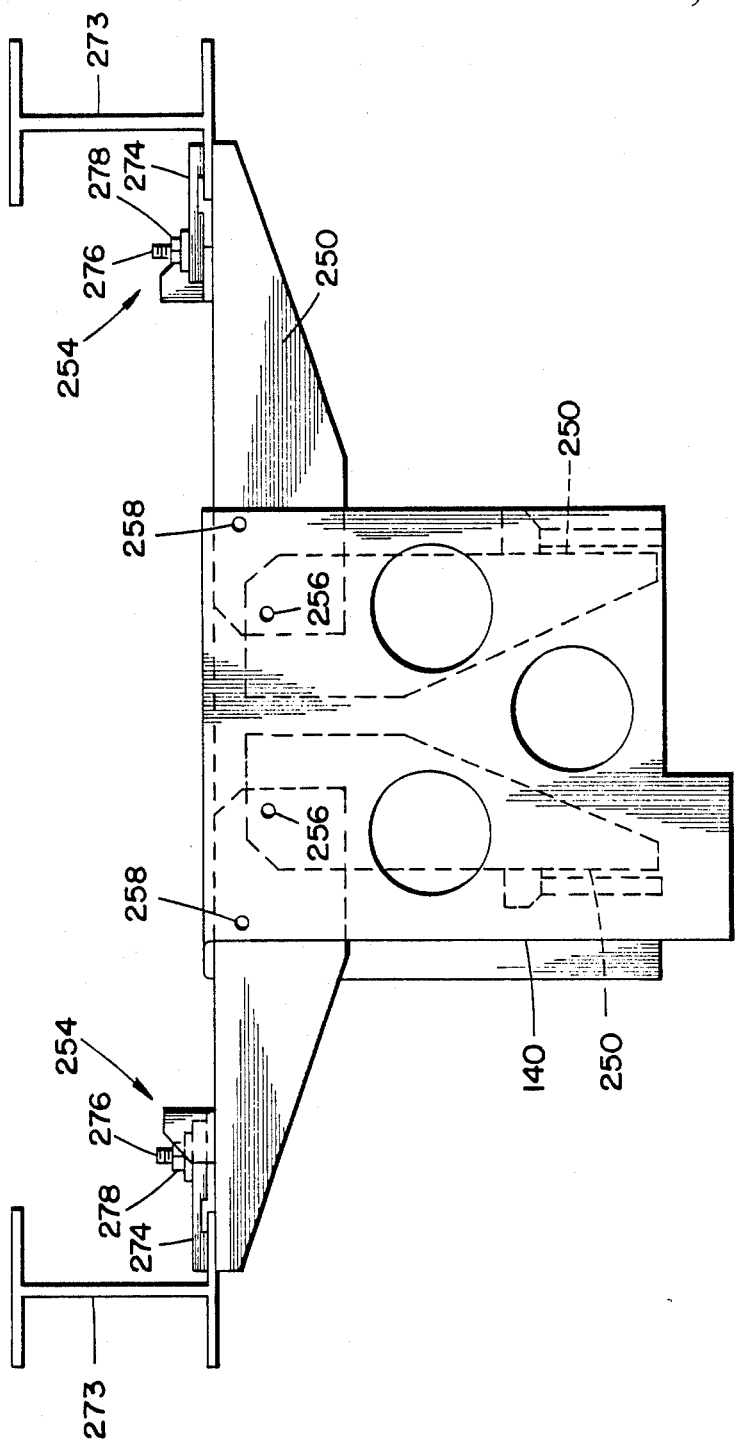

COMBINATION UNDERSLUNG AND FRONT WALL MOUNTED ELECTRIC GENERATOR UNIT HOUSING FOR USE WITH REFRIGERATED FREIGHT CONTAINERS

BACKGROUND

The present invention relates to electric generator unit housings for refrigerated freight containers which are transportable by truck, rail, and ship. More particularly, the invention relates to an electric generator unit housing which may be mounted in both a "clip-on" fashion, i.e. mounted to the front wall of a refrigerated freight container, or in an "underslung" fashion i.e. mounted to a container chassis. For purposes herein, it should be understood that the term "housing" is defined herein to include the mechanisms which are used to attach the electric generator unit housing to the refrigerated freight container or container chassis.

Refrigerated freight containers which are transportable by truck, rail, and ship, are well known in the art. Electric generator units which attach either to a chassis transporting such a container, or which attach directly to the refrigerated freight containers to provide the necessary power are also known in the art. Indeed, standards for such refrigerated freight containers and their attachments have been promulgated by ANSI and ISO and specify loads and fittings to be used with containers utilized in international commerce.

Those skilled in the art will recognize that different requirements present themselves for each mode of transportation of the containers. For example, in the railroad mode, a higher fore and aft load requirement is necessary than on ship due to coupling forces which occur during reclassification of railcars. In the ship mode, to permit stacking and/or proper loading it is preferable that the generator unit housings not extend above the top plane of the refrigerated container. In the truck mode, if the generator housing is mounted to the front of the container ("clip-on"), it is necessary to provide swing clearance for the tractor pulling the chassis mounted container. If the generator housing is mounted to the chassis ("underslung"), a sufficient ground clearance is necessary to prevent damage from road hazards.

Presently in the art, there are no generator unit housings which meet all the requirements for truck, rail, and ship transport. For example, generator units which are attached in an underslung fashion to container chassis are known but are only useful in the truck mode. This is so because they are located beneath the chassis and cannot be used when a container is stacked onto another container or when the container is placed on a railcar. Likewise, the housing of one clip-on unit known in the art which attaches to the front top area of the container, extends past the top plane of the container and thereby inhibits the transfer of the container between ship and land. Such difficulties obtain due to the fact that the crane spreader used in the transfer is impeded by any projection above the top plane of the container. Still another housing which attaches to the front top area of the container through the use of special fittings to make it transferrable by crane extends into the swing clearance radius required by the tractor and thus does not meet that requirement.

The fact that the generator unit housings of the art are unable to meet all the requirements of rail, truck, and ship transportation is not the only problem in the art. An additional problem is that some refrigerated containers are particularly arranged to be equipped with underslung generators, while other containers are particularly arranged to be equipped with clip-on generators. This lack of uniformity forces the operators to maintain two imcompatable sets of generators which leads to unacceptable expenses and complications. Moreover, none of the generator units of the art are capable of being attached to the refrigerated containers in both the clip-on and underslung arrangements.

SUMMARY OF THE INVENTION

It is therefore an object of the invention to provide an electric generator unit housing which permits the generator unit to be mounted to the container in a clip-on fashion and to a chassis in an underslung arrangement.

It is a further object of the invention to provide a generator unit housing which meets all the requirements of rail, truck, and ship transport.

It is yet a further object of the invention to provide a generator unit housing which meets all the requirements of rail, truck, and ship transport, and which permits the generator unit to be mounted in both a clip-on and underslung arrangement.

In accord with the objects of the invention, a generator unit housing which meets all the requirements of rail, truck and ship transport, and which permits the generator unit to be mounted to a container in a clip-on fashion and to a chassis for supporting a container in an underslung fashion, generally comprises:

(a) a substantially rigid frame having a horizontal member of a length substantially equal to the width of the front face of the container, and at least two vertical posts integrally connected to the horizontal member, one at each end of the horizontal member;

(b) two fitting means extending outward from substantially the top of the vertical posts, with the fitting means arranged for engaging the front openings in the top corner castings of the container so as to permit the generator unit to be hung from the container and so as to substantially remove vertical forces from the generator unit housing when it is hung from the container;

(c) at least two horizontal force clamps integrally connected to the vertical posts of the generator unit housing for engaging the corner posts of the container so as to substantially remove horizontal forces from the generator unit housing when it is hung from the container, the clamps being capable of being extended beyond the back plane of the corner posts of the container and of being rotated so as to engage the said corner posts; and (d) at least two foldable attachment arms which are at least indirectly supported by said rigid frame, with the arms extending in a manner perpendicular to the horizontal member of the rigid frame and engaging the bottom parallel I-beams of the container chassis and being clamped thereto when said arms are extended, and with the arms retracted when the generator unit housing is used in a clip-on mode.

Preferably, in the clip-on mode, four horizontal force clamps are used to take out horizontal loads, with two clamps attached to each vertical post of the rigid frame near the bottom and middle of each post. The horizontal force clamps use means to provide a self-locking assembly so that the clamp which grabs the rear of the container corner posts does not loosen during transport. In the underslung mode, preferably, four foldable arms are used with the arms terminating in clamps which can clamp onto the I-beams of the container chassis. The arms are housed in and attached to essentially rectangular frames which are in turn attached to the horizontal member of the rigid frame. The rectangular frames have their long sides perpendicular to the horizontal member. A second horizontal member attaches to, connects, and stabilizes the rectangular frames.

The preferred housing further includes rectangular tubular members for accepting fork-lift tines, with the tubular members being perpendicularly attached to the bottom of the rigid frame. The tubular members have a large portion of the bottom cut away such that the fork-lift truck may maneuver at various angles with respect to the container especially during withdrawal of the tines from the housing without forcing the housing to rotate along with the fork-lift. In this manner, additional tolerance is permitted for installing the fitting means and clamps. Yet another feature of the preferred embodiment is the provision for a large fifty gallon fuel tank or the like. Thus, I-beam like sections are added spaccedly adjacent and parallel the fork-lift tubes, and the fuel tank may be attached to the I-beam like sections such as via clamps so that the tank runs substantially parallel and below the horizontal member of the generator unit housing. In the underslung arrangement, the tank is mounted separately to the I-beams of the chassis.

A better understanding of the invention, and additional advantages and objects of the invention will become apparent to those skilled in the art upon reference to the detailed description and the accompanying drawings.

BRIEF DESCRIPTION OF THE DRAWINGS

FIG. 1 is a schematic diagram showing placement of the elements of a generator unit which are housed in the housing invention;

FIG. 2a is top view of the rigid frame structure of the housing for a generator unit invention;

FIG. 3 is a diagram of the fittings of the invention which engage the front top openings of the corner post castings of the refrigerated unit;

FIG. 4 is a diagram of the horizontal force clamp of the housing invention;

FIG. 5a is a perspective of the rigid frame structure with the foldable attachment arms in an extended mode with relation to the I-beams of a chassis; and FIG. 5b is a diagram of the foldable attachment arms of the housing invention is a rectracted mode and in an extended mode with relation to the I-beams of the chassis.

DETAILED DESCRIPTION OF THE PREFERRED EMBODIMENT

Figure 2B:
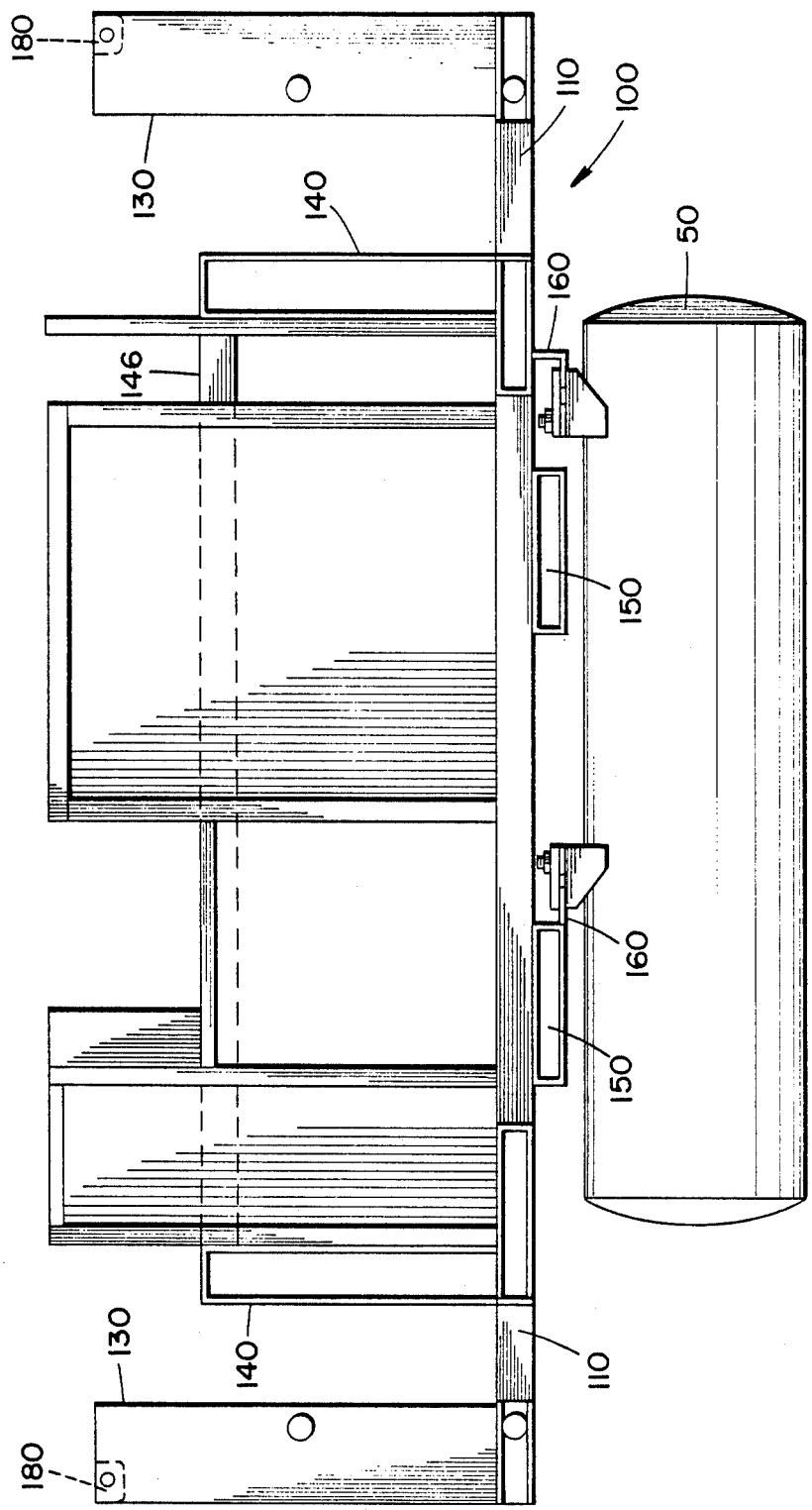
FIG. 2b is a front view of the rigid frame structure of the housing for a generator unit invention.

The invention for a generator unit housing which is to be mounted in either a clip-on or underslung fashion to a container or container chassis is best understood in context. Thus, the basic components of the generator unit 10 for the refrigerated freight container (not illustrated) are seen in FIG. 1. The generator unit 10 basically includes an engine and alternator 20, a gauge section 30, a control section 40, a relocatable fuel tank 50, fuel filters 60, a hose 64 for connecting an air breather 70 to the engine 20, a power receptacle 72, other standard equipment (not shown) and a housing 100 which will be described in more detail hereinafter. It will be appreciated that the various elements of the generator unit 10 other than the housing 100 work in a manner which is well known in the art to permit the generator to generate the electricity required to permit the refrigeration of the container. The only specific requirement that the generator unit elements must meet for purposes of the invention beyond the ANSI or ISO standards is that they must fit into the provided housing which is restricted in shape and volume due to considerations discussed in the Background section herein. For example, it will be seen that the base or horizontal member of the generator unit 10 takes almost a bow-like shape to meet the necessary swing clearance requirements of the tractor cab. Likewise, it will be seen that the height of the unit is restricted so that the generator unit 10 neither extends beyond the top plane of the refrigerated freight container, thereby permitting a crane spreader to lift the refrigerated freight container with the generator unit attached thereto for stacking in the ship mode, nor extends downwardly more than about 30 inches. By restricting the height of the unit in this manner, the necessary ground clearance will be provided when the generator unit is attached to the container chassis in the underslung mode. Further, for the underslung mode, the unit must be provided with clear areas so as not to interfere with any chassis crossmembers or other structures.

Turning to FIGS. 2a and 2b, the details of the frame structure of the housing 100 are seen. (It should be noted at the outset that unnumbered members seen in FIGS. 2a and 2b are primarily provided to support or house generator unit components, or to support cosmetic panels, and are not considered part of the frame 100 or housing invention.) The frame structure has as its base a horizontal member 110 which is preferably a carbon steel section of a total thickness of approximately two inches. The length of substantially rigid horizontal member 110 (approximately ninety-two inches) is substantially equal to the horizontal length of the front face of the container so as to permit fitting means 180 which are at either end to fit into the top corner castings 113 (which sit atop the corner posts 111 which are seen in FIG. 4) of the container 115. The horizontal member 110 is also shaped, as seen in FIG. 2b, so that the housing 100 will not extend beyond a sixty-two inch radius 121 having at its center a point 123 which is set back thirty-six inches from the front end 127 of the container 115 (and forming a partial circumference C). Thus, at its center area, the horizontal member 110 is provided with a depth of a little over twenty-two inches. However, at about twenty-two inches away from the center line, the horizontal member tapers off at an angle of about twenty-five degrees from the horizontal. Thus, the overall shape of the horizontal member 110 appears as a bow. If desired, the tapering off can be accomplished by having ninety degree turns in the periphery of the horizontal member 110 in a step-like fashion with the overall appearance still being relatively bow-like.

The frame structure of housing 100 further includes at least two vertical posts 130 integrally connected to the horizontal member 110, one at each end of said horizontal member. The posts 130 need not be rectangular in cross section, but should provide enough rigidity to help support the structure. The posts 130 are approximately twenty-five inches in height so that the overall height of the unit 10 (excluding the fork-lift pockets) is approximately twenty-seven inches. With such a unit height, with the unit in the underslung mode and hung from the bottom of the chassis I-beams, an adequate ground clearance for road transport will be provided. The vertical posts 130 serve not only to provide structural integrity in the vertical fashion to the unit 10, but also to provide supports for both the fitting means 180 (described hereinafter with reference to FIG. 3) which engage the corner castings 113 of the container 115, and the horizontal force clamps 200 (described hereinafter with reference to FIG. 4) which must clamp around the corner posts 111 of the container 115.

The vertical posts 130 may also serve to help support arm housing frames 140 which house and support the foldable attachment arms 250 (described hereinafter with reference to FIGS. 5a and 5b), and which may also be considered part of the frame. The vertical arm housing frames 140 are integrally connected to the horizontal base 110 and are stabilized by member 146.

According to the preferred embodiment of the invention, the frame 100 of the housing also includes tubular members 150 which are arranged to accept fork-lift tines. The tubular members 150 are substantially rectangular in cross section and are integrally connected to the horizontal bottom member 110 such that the lengths of horizontal bottom member 110 and the tubular members 150 are perpendicular to each other. Preferably, the bottom surface of the tubular members 150 have large cut-outs (not shown) such that only strips at the front and rear of the tube remain. In this manner, increased angular tolerance is provided for situations where the fork-lift truck and the container are not resting on a common plane. Thus, for example, when the generator unit 10 is lifted by the fork-lift, and the fitting means 180 of the housing 100 engage the corner castings 113 of the container 115, it is found that it may be impossible to remove the fork-lift tines from the tubular members 150 without disengaging the generator unit 10 from the container 115 when the fork-lift and the container are angled relative to each other and the bottom surfaces of the tubular members 150 are solid. However, by providing only strips at the front and rear of the bottom surfaces of the tubular members, disengagement is possible if the fork-lift tines may be initially withdrawn at least beyond the rear strip. It has been found that a front strip of three inches and a rear strip of three inches accommodated an adequate angle between the generator unit 10 and the container 115. While a narrower rear strip provides a larger angle tolerance, it should be appreciated that the strips must be wide enough to safely support the lifting of the generator unit 10 by fork-lift tines.

Finally, with regard to the frame of the housing 100, fuel tank supports 160 are preferably provided to permit a large fuel tank 50, such as a fifty gallon tank, to be attached externally to the generator unit 10 if desired. The fuel tank supports 160 are provided in the form of I-beam-like sections which are attached to the bottom of the horizontal member 110 of the housing 100 and which are spacedly adjacent and parallel the fork-lift tubes 150. The I-beam supports 160 are arranged to be spaced at the same spacing as the spacing of the I-beams of the chassis normally used to transport containers. In this manner, the clamping arrangement can be similar whether the tank 50 is to be used with a generator unit 10 which is attached to container 115 in a clip-on fashion or to a chassis in an underslung fashion. The tank clamping means may be identical to the clamping means 254 discussed hereinafter with reference to FIG. 5b. It will be appreciated that in the clip-on arrangement, the large tank 50 will hang below the generator unit 10 and will be supported by the supports 160. On the other hand, in the underslung arrangement, the tank 50 will sit in front or behind the generator unit 10 and will be supported by the I-beams of the chassis.

While the frame of the housing 100 provides the structural integrity to support the generator unit 10, it is the foldable attachment arms 250 which permit the generator unit 10 to be mounted to the chassis in an underslung fashion, and the fittings 180 and the horizontal force clamps 200 which permit the generator unit 10 to be mounted on the container in a clip-on fashion. As seen in FIG. 2a and FIG. 3, the fittings 180 extend outwardly towards the container 115 from near the top of the vertical posts 130 so as to engage the front openings 183 of the corner castings 113 of the container unit 115. As seen in FIG. 3, and in accord with the specification ANSI MH5-1.4 M which provides the top corner casting opening dimensions, the front top opening 183 is acorn-like in shape. In accord with the preferred embodiment of the invention, the fitting means 180 has an engaging section that is generally rectangular in shape with rounded edges to expedite insertion, and a connecting section which does not extend down as far as the engaging section and which is generally rectangular on top and rounded on the bottom. Thus, the fitting means 180 is arranged such that when the generator housing 100 is lifted into the proper position, the fitting means 180 is inserted into the opening 183 in the corner casting 113 (as seen in solid lines in FIG. 3). The generator unit 10 may then be hung from the container 115 by means of the fittings 180 by lowering the entire generator housing 100, including the fittings 180, such that engaging sections of the fittings 180 take positions shown by the dotted lines in FIG. 3 relative to the corner castings 113 with the connecting sections of the fittings 180 resting on and extending through the rounded bottom of the acorn-like front top opening 183. In this position, each corner casting 113 provides two lips relative to the engagement sections of the fittings 180 which prevent the fittings 180 from disengaging from the castings 113. Those skilled in the art will appreciate that with the provided arrangement, the fittings 180 thereby remove substantially all the vertical forces from the housing when it is hung from the container 115. Of course, in designing the manner in which the fitting means 180 is attached to casting 113, it must be recognized that the fittings 180 have to support the entire weight of the generator unit 10.

While the fittings 180 remove the vertical forces to which the housing 100 is subject, the horizontal forces may not adequately be removed by the fittings. Thus, horizontal force clamps 200 are provided for that purpose. As seen in FIGS. 2a and 4, the horizontal force clamps are connected to the vertical posts 130 of the housing and are arranged to engage the corner posts 111 of the container 115. The clamps 200 are able to engage the corner posts 111 because gaps in the front surface of the container 115 exist behind and beside the corner posts 111 of the unit 115. The gap behind the corner post 111 is relatively the larger of the two gaps, and ladder rungs are placed therein. In engaging the corner posts 111 with the clamps 200, care must be had to avoid the ladder rungs. Preferably, four horizontal force clamps 200 are provided for removing horizontal forces, with two clamps attached to each vertical housing post 130 near the bottom and middle of each post.

Details of the horizontal force clamp 200 are seen in FIG. 4. The clamp 200 preferably comprises an outer member 202, an inner sliding member 204 which is externally threaded over part of its length and which includes a clamping hand 206 for engaging the corner post 111, a threaded nut 208 for locking the inner sliding member 204 with respect to the outer member 202, and means 212 and 214 for turning and locking the inner sliding member 204 ninety degrees with respect to the outer member 202. As will be appreciated, the outer member 202 may either be a cylinder which is attached to vertical member 130 by extending through it, or if desired, the outer sliding member may be the hole in the vertical member 130 itself if the walls of the vertical member 130 are thick enough and strong enough to support the forces which will be transferred therethrough.

The inner sliding member 204 is arranged to be retractable and extendable through the outer member 202. On the container end of the inner sliding member 204, a hand 206 is provided for engaging the corner post 111 of the container 115. However, in order to permit the hand 206 to engage the corner post, the inner member 204 of the clamp 200 must be rotatable. Thus, with the hand 206 of the inner member 204 arranged in a vertical position, the inner sliding member 204 may be extended into the gap adjacent the corner post. After the inner sliding member 204 has been extended far enough to permit the hand 206 to grab the back face of the corner post (there being a gap behind the post also), the inner member 204 is rotated ninety degrees such that the hand extends horizontally behind the corner post. The extension and rotation of the inner member 204 is preferably accomplished via the cooperative use of a locking handle 212 and slot 214 which is cut in the outer member 202. The slot 214 is arranged to have a first section run in the direction of the length of the clamp 200, to have a second section make a ninety degree turn at its end closest the container and run along circumference of the outer sliding member 202 for $\pi/2$ radians, and then have a third section to make another ninety degree turn and run in the direction of the length of the clamp away from the container. The handle 212 is attached to the inner sliding member 204 and extends through the slot 214. Thus, by pushing forward or pulling backward on the handle 212, the inner sliding member 204 will extend into the refrigerated container gap, or will be retracted therefrom respectively, with the handle 212 sliding through the slot 214. When the inner sliding member 204 has been extended such that the hand 206 is free to rotate behind the corner post, the handle 212 may be turned ninety degrees with the second section of the slot 214 accommodating such a turn. The inner sliding member 204 may then be rotationally locked relative to the outer member 202 by pulling backward on the handle 212 so that the handle 212 slides along the third section of the slot.

In order to guarantee that the hand 206 of the inner sliding member 204 tightly grabs the corner post 111, a threaded nut 208 is provided. The nut 208 is threaded over the portion of the inner sliding member 204 extending out of the outer member 202 and away from the container 115. The nut is arranged to be too large to fit in the outer member 202, so that when the nut reaches the outer member 202, it pulls the inner sliding member 204 out until the hand 206 has tightly engaged the corner post 111. Preferably, in order to ensure that the nut 208 and hand 206 do not loosen, the nut 208 and inner member 204 are provided with a Dardalet thread which causes the clamp to be self-locking.

As disclosed, the fittings 180 and horizontal force clamps 200 provide a manner for permitting the generator unit 10 to be clipped onto the container 115. The fittings and clamps, together with the frame, provide a housing 100 which meets the structural and size and shape requirements of the various standards for rail, truck, and ship travel. However, in accord with the objects of the invention, it is desirable to provide a single housing for a generator unit which will also permit the generator unit to be attached to the container chassis in an underslung fashion. To meet these goals, two sets of foldable attachment arms 250 which are housed in and supported by the vertical arm housing frames 140 are provided as part of the housing 100 in the preferred embodiment of the invention.

One set of the foldable attachment arms 250 which are housed in the arm housing frame 140 are seen in detail in FIGS. 5a and 5b. In FIG. 5b, the dotted lines show the foldable attachment arms in a retracted mode, while the solid lines show the arms in an extended mode such that they are clamped to the I-beams of the chassis. In order for the foldable attachment arms 250 to function in the preferred manner, accompanying structure such as I-beam clamps 254, fixed pins 256, and removable support pins 258 are preferably included.

When the generator unit 10 is used in the clip-on mode, the foldable attachment arms 250 are kept in their rectracted mode inside vertical arm housing 140 because if they were extended, they would extend past the permitted sixty-two inch radius, and extend beyond the front plane of the container 115. Thus, the arms may be spring loaded in a retracted position, or kept in a retracted position through the use of bolts or the like, if desired. Or, since gravity forces would naturally tend to keep the arms retracted, no such particular means are mandatory.

In the underslung mode, where the attachment arms 250 must be extended, it will be seen in FIGS. 5a and 5b that the arms 250 are free to rotate around fixed pins 256 and thereby swing outward. The arms may then be secured in their extended position through the use of the removable support pins 258 which are placed through a prepared hole in vertical arm housing 140 and through corresponding holes in arms 250 such that the arm 250 and housing 140 are fastened one to the other. Typically, the attachment arms 250 must be manually raised into their extended position. If desired, however, the arms 250 may be spring loaded to help the arms extend.

As is indicated by FIG. 5a, in their extended position, the arms 250 extend in a direction perpendicular to the length of the generator unit 10. Thus, with the generator unit 10 being placed in parallel with the chassis I-beams 273 which support the container 115 (shown in FIG. 2a), the arms 250 are in position to support the generator unit 10 after being clamped to the I-beams with clamps 254. However, it should be understood that preferably, two sets of arms 250 which are supported by and housed in vertical arm housings 140 are used to support the generator unit 10. It should also be understood that in the preferred embodiment, the thickness of each arm is approximately equal to the inner width of arm housing frame 140, although the arms are not typically solid.

The clamps 254 for arms 250 which provide the actual clamping action may be integral to the arms 250, or may be attached thereto if desired. If the clamps are integral to the arms, the bottom clamping surfaces are the arms 250 themselves. If not, bottom surfaces which are attached to the arms are provided. The clamps further include top clamping surfaces 274 having oblong cut-outs, bolts 276 which are arranged to extend through the cut-out portion of the top clamping surfaces and through holes in the bottom clamping surfaces, and nuts 278 for tightening the clamp around the I-beams. When the arms 250 are extended and are ready for clamping to the I-beams 273, the generator unit 10 is lifted by a fork-lift or the like, until the arms 250 contact the bottom surface of the I-beams 273. Then, the top clamping surfaces 274 are slipped on top of the bottom flange of the I-beam. Because of their oblong cut-outs, the top clamping surfaces 274 may be positioned in a desired position before the nuts 278 are tightened to ensure a tight clamping action. Indeed, it should be understood that the provided housing 100 can be used in an underslung fashion with chassis which are constructed from I or C section beams, as the top clamping surfaces 274 may slide far enough relative to the lower clamping surfaces to extend, in effect, the arms and clamps and permit C-beam clamping. Those skilled in the art will appreciate that with the provided arms and clamps as shown in FIGS. 5a and 5b, the vertical and horizontal forces that the housing is subjected to in the underslung arrangement are removed.

Those skilled in the art will recognize that the provided housing invention permits an operator to change the generator 10 from a clip-on mounted unit to an underslung mounted unit in a simple and expedited manner with the use of a fork-lift and a wrench. If the generator is attached to a container 115 in a clip-on fashion, Dardelet threaded nuts 208 are loosened by wrench thereby releasing hand 206 from the back of the corner posts 111 (See FIG. 4). The handles 212 are then pushed towards the container 115, rotated along the circumference of the outer member by ninety degrees, and pulled toward the operator to retract the inner sliding member. The generator unit 10 may then be removed from the container 115 by putting the fork-lift tines into the fork-lift pockets 150, and lifting the entire unit up such that the fitting means 180 disengage from the corner fittings 113, and then out.

With the generator unit 10 disengaged from the container 115, and lowered by the fork-lift, the generator unit may be prepared for attachment to the chassis in an underslung fashion. Thus, if the arms are kept in a retracted position through the use of pins or bolts, the pins or bolts are removed. The arms 250 are then rotatably swung upward. They arms are then fastened in their extended position by inserting the support pins 258 in their supporting locations through the arms 250 and the arm housing frames 140. The entire generator unit 10 is then lifted by the fork-lift such that the arms 250 touch the bottom of the I-beam chassis. The top clamp surfaces 274 are then slipped over the top of the bottom flanges of the I-beams and fastened by tightening nuts 278 with a wrench. The tines of the fork-lift are then removed from the fork-lift pockets, and the operation is completed. Of course, if a large fuel tank had been hung from the I-beam sections 160 when the generator unit 10 was used in a clip-on fashion, the tank would have been unclamped and removed prior to disengaging the unit 10 from the container 115. After the generator unit 10 was reengaged in an underslung fashion, the tank would be attached via clamps to the I-beam chassis supporting the container 115 and hung therefrom.

There has been described and illustrated herein housings for electric generator units which are arranged to be mounted in both a clip-on and underslung arrangement to a container and chassis therefor. While particular embodiments of the invention have been described, it is not intended that that the invention be limited thereby, as it is intended that the invention be broad in scope and that the specifications be read likewise. Thus, while the preferred invention was described as preferably having four foldable arms, those skilled in the art will recognize that additional arms may be provided if desired. Likewise, while the arms were described as being of a certain thickness, having a particularly described clamp at the ends thereof, and as having particularly means for holding the arms either in the retracted or extended positions, those skilled in the art could vary the thickness, extension and folding mechanisms, and the clamp arrangement in many obvious manners without deviating from the scope of the invention. Indeed, what is of primary importance is that the arms be extendable such that they can reach and be clamped to the parallel I-beam supports of the chassis (which are thirty-six inches apart with two inch lips), and that they be retractable so that they will fit inside the housing (which is at maximum twenty-two inches deep and twenty-seven inches high). Of secondary importance is the ability of the clamps to accommodate both I-beam and C-beam supports by being extendable.

It should further be recognized that while the fitting means and horizontal force clamps were described in detail, the shape of the fitting means as well as the shape and the elements of the horizontal force clamps could be changed without departing from the scope of the invention. Thus, for example, the fitting means could be perfectly square, or even triangular in shape, and still meet the requirements set forth for the fitting means in the specification. In the same vein, different means for extending, rotating and locking the inner sliding member hand could be utilized rather than the slot and handle arrangement and the self-locking threaded mechanism. Further, it should be appreciated that while terms such as "posts", "frames", "arms", "hands", "horizontal force clamps", etc., were used to describe the invention, the terms are not meant to be limiting, and should be interpreted broadly. Thus, for example, a post need not have four sides. Likewise, a horizontal force clamp is a clamp which removes horizontal forces and is not intended to imply a particular structure. Therefore, it will be apparent to those skilled in the art that other changes and modifications may be made to the invention as described in the specification without departing from the spirit and scope of the invention as so claimed.

I claim:

1. A housing for an electric generator unit for a container, wherein said housing is subject to both vertical and horizontal forces when hung from said container, said housing comprising:
   (a) a substantially rigid frame;
   (b) mounting means supported by said substantially rigid frame for mounting said housing on said container so as to substantially remove both horizontal and vertical forces from said housing; and
   (c) retractable means supported by said substantially rigid frame for mounting said housing on a chassis which supports said container, said retractable means being extended when said housing is mounted on said chassis, and said retractable means being retracted when said housing is mounted on said container.

2. A housing for an electric generator unit according to claim 1, wherein:

said mounting means includes fitting means arranged for engaging front openings in top corner post castings of said container so as to permit said housing to be hung from said container and so as to substantially remove vertical forces from the housing when it is hung from said container and horizontal force clamps for engaging corner posts of said container so as to substantially remove horizontal forces from the housing when it is hung from said container, at least a portion of said clamps being capable of being extended beyond the corner posts of said container and of beng rotated so as to permit engagement of said clamps with said corner posts, wherein said housing allows said generator unit to be used with said container during road, rail and ship transport.

3. A housing for an electric generator unit according to claim 2, wherein:

said retractable means includes at least two foldable attachment arms which are supported by said rigid frame, said arms being folded inside said housing when said fitting means are engaged with said corner posts, and said arms being capable of being extended in a manner so as to perpendicularly engage and be clamped to said chassis when said arms are extended.

4. A housing for an electric generator unit for a container according to claim 1, wherein:

said housing allows said generator unit to be used with said container during road, rail and ship transport.

5. A housing for a generator unit capable of being mounted on a freight container having corner posts and top corner post castings with front openings, and capable of being mounted on a chassis for supporting said container, the chassis having parallel beam supports, wherein said housing is subject to both vertical and horizontal forces when hung from said freight container, the generator unit housing comprising:

(a) a substantially rigid frame having a horizontal member of a length substantially equal to the length of the front face of said container, and at least two vertical posts integrally connected to said horizontal member, one at each end of said horizontal member;

(b) two fitting means extending toward said container from said vertical posts, with the fitting means arranged for engaging said front openings in said top corner post castings of said container so as to permit said housing to be hung from said container and so as to substantially remove vertical forces from the housing when it is hung from said container;

(c) at least two horizontal force clamps connected to said vertical posts for engaging said corner posts of said container so as to substantially remove horizontal forces from the housing when it is hung from said container, at least a portion of said clamps being capable of being extended in a manner perpendicular to said horizontal member beyond the corner posts of said container and of being rotated so as to permit engagement by said portion of said clamps with the back side of said corner posts; and (d) at least two foldable attachment arms which are supported by said rigid frame, said arms being folded inside said housing when said fitting means are engaged with said corner posts, and said arms being capable of being extended in a manner perpendicular to said horizontal member so as to perpendicularly engage and be clamped to said chassis parallel beam supports when asid arms are extended.

6. A housing for a generator unit according to claim 5, wherein:

said at least two foldable attachment arms comprises four foldable arms with said arms terminating in beam clamps for clamping onto said chassis beams.

7. A housing for a generator unit according to claim 6, wherein:

said beam clamps are comprised of a bolt, a nut, a bottom clamping surface arranged to accept said bolt, and a top clamping surface arranged to accept said bolt and to move relative to said bottom clamping surface with said bolt in a fixed position.

8. A housing for a generator unit according to claim 7, wherein:

said substantially rigid frame further includes substantially rectangular arm housing frames for housing and supporting said foldable attachment arms, with said substantially rectangular arm housing frames being attached to said horizontal member, and a second horizontal member attached to said rectangular arm housing frames for stabilizing said rectangular arm housing frames.

9. A housing for a generator unit according to claim 5, wherein:

said substantially rigid frame further includes substantially rectangular arm housing frames for housing and supporting said foldable attachment arms, with said substantially rectangular arm housing frames being attached to said horizontal member, and a second horizontal member attached to said rectangular arm housing frames for stabilizing said rectangular arm housing frames.

10. A housing for a generator unit according to claim 5, wherein:

said horizontal force clamps each comprise an at least partially threaded first sliding member which is extendable through an opening in said vertical post and into a space between said corner post of said container and the main body of said container, the first sliding member including a clamping hand which is arranged to overhang said first sliding member in such a manner so as to be able to engage said corner post when rotated;

a means for at least partially rotating said hand of said partially threaded first sliding member; and a threaded nut for locking said horizontal force clamp with said clamping hand engaging said corner post.

11. A housing for a generator unit according to claim 10, wherein:

said horizontal force clamps each further comprise a second member through which said first sliding member extends, said second member opening through and being integrally attached to said vertical post, and said means for at least partially rotating said first sliding member includes a slot having a first section running along a partial length of said second member and a second section turning in a substantially perpendicular fashion to extend through a part of said second member circumference, and a handle attached to said first sliding member and extending outwardly through said slot.

12. A housing for a generator unit according to claim 11, wherein:

said slot has a third section turning in a substantially perpendicular fashion after said second section and running substantially parallel to said first section away from said container, wherein said first sliding member may be rotationally locked relative to said housing by sliding said handle into said third section of said slot.

13. A housing for a generator unit according to claim 12, wherein:

said partially threaded first sliding member and said threaded nut are threaded according to a Dardalet threaded arrangement such that said horizontal force clamp is self-locking when said nut engages said vertical post and said clamping hand engages said corner post.

14. A housing for a generator unit according to claim 13, wherein:

said second section of said slot extends approximately ninety degrees through said second member circumference; and said hand of said first sliding member is integrally attached to said first sliding member.

15. A housing for a generator unit according to claim 10, wherein:

said partially threaded first sliding member and said threaded nut are threaded according to a Dardalet threaded arrangement such that said horizontal force clamp is self-locking when said nut engages said vertical post and said clamping hand engages said corner post.

16. A housing for a generator unit according to claim 10, wherein:

said substantially rigid frame further includes substantially rectangular arm housing frames for housing and supporting said foldable attachment arms, with said substantially rectangular arm housing frames being attached to said horizontal member, and a second horizontal member attached to said rectangular arm housing frames for stabilizing said rectangular frames.

17. A housing for a generator unit according to claim 16, wherein:

said substantially rigid frame further includes rectangular substantially tubular members for accepting fork-lift tines, said rectangular substantially tubular members being attached to the bottom of said horizontal member.

18. A housing for a generator unit according to claim 17, wherein:

said substantially rigid frame further includes fuel tank supports attached to the bottom of said horizontal member and spacedly adjacent and parallel said fork-lift tubes.

19. A housing for a generator unit according to claim 5, wherein:

said substantially rigid frame further includes rectangular substantially tubular members for accepting fork-lift tines, said rectangular substantially tubular members being attached to the bottom of said horizontal member.

20. A housing for a generator unit according to claim 19, wherein:

said rectangular substantially tubular members for accepting fork-lift tines are further defined with the bottom surface of said tubular members having substantially rigid material only at a strip at the rear of said tube and a strip at the front of said tube.

21. A housing for a generator unit according to claim 5, wherein:

said fitting means extend toward said container from substantially the top of said vertical posts such that when said fitting means engage said corner castings, said housing extends only as high as said container, and said housing is arranged such that when said fitting means engage said corner castings, the housing is within a sixty-two inch radius from a point thirty-six inches back from the middle of a line defined by the intersection of the front face and top face of said container.

* * * * *